(12) United States Patent
Goodman et al.

(10) Patent No.: US 7,307,628 B1
(45) Date of Patent: Dec. 11, 2007

(54) DIAMOND CULLING OF SMALL PRIMITIVES

(75) Inventors: Christopher J. Goodman, Round Rock, TX (US); Craig M. Wittenbrink, Palo Alto, CA (US); Robert J. Hasslen, Redwood City, CA (US); Thomas M. Ogletree, Lakeway, TX (US); Scott R. Whitman, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 489 days.

(21) Appl. No.: 10/913,637

(22) Filed: Aug. 6, 2004

(51) Int. Cl.
*G06T 15/40* (2006.01)

(52) U.S. Cl. .................................... 345/421

(58) Field of Classification Search ............... None
See application file for complete search history.

(56) References Cited

U.S. PATENT DOCUMENTS

| 5,253,335 A | * | 10/1993 | Mochizuki et al. | 345/422 |
| 5,287,438 A | * | 2/1994 | Kelleher | 345/613 |
| 5,594,854 A | * | 1/1997 | Baldwin et al. | 345/441 |
| 5,815,162 A | * | 9/1998 | Levine | 345/443 |
| 6,278,457 B1 | * | 8/2001 | Bernardini et al. | 345/420 |
| 6,437,780 B1 | * | 8/2002 | Baltaretu et al. | 345/423 |
| 6,788,301 B2 | * | 9/2004 | Thrasher | 345/443 |
| 6,995,769 B2 | * | 2/2006 | Ordentlich et al. | 345/520 |
| 7,142,224 B2 | * | 11/2006 | Funakubo et al. | 345/611 |

OTHER PUBLICATIONS

Segal et al. "*The OpenGL Graphics System A Specification*" (Version 1.2.1) Apr. 1, 1999 Silicon Graphics.

* cited by examiner

*Primary Examiner*—Ulka Chauhan
*Assistant Examiner*—Peter-Anthony Pappas
(74) *Attorney, Agent, or Firm*—Townsend and Townsend and Crew, LLP (57) ABSTRACT

Graphics processing devices and methods are provided for culling small primitives that do not cover any pixels. A boundary (e.g., a diamond) is defined around a pixel center, with pixel coverage being determined for some types of primitives based on whether the boundary is crossed. The boundaries divide the raster into internal regions and external regions. Each region is assigned a unique canonical identifier. Each vertex of a primitive is assigned the canonical identifier corresponding to the region that contains that vertex. The canonical coordinates of the vertices are used to cull primitives that do not satisfy the boundary crossing coverage rules for any pixels.

19 Claims, 9 Drawing Sheets

FIG. 1

(PRIOR ART)

DIAMOND CULLING OF SMALL PRIMITIVES

CROSS-REFERENCES TO RELATED APPLICATIONS

The present disclosure is related to commonly-assigned co-pending U.S. patent application Ser. No. 10/913,667, filed on the same date as the present application, entitled "Culling Before Setup," which disclosure is incorporated herein by reference for all purposes.

BACKGROUND OF THE INVENTION

The present invention relates in general to computer rendering technologies, and in particular to techniques for diamond culling of small primitives.

Computer-based rendering systems generally receive image data in the form of primitives (such as lines or triangles) that represent objects to be drawn. After transforming the primitives to a viewing space, the primitives are rasterized to generate pixel data values. Rasterization generally involves determining, for each pixel, which primitive should be seen on the screen and shading the pixel based on attributes of that primitive. As one aspect of this process, it is generally necessary to determine which of the primitives cover a given pixel. In some cases, multiple primitives may cover the same pixel, and the rasterizer selects among them, e.g., by identifying which is closest to the eyepoint.

One challenge in determining coverage is the case where a primitive covers only part of a pixel. For example, a line is generally less than a pixel wide; in the case of a triangle, pixels along the edges may be only partially covered by the triangle. Coverage rules are generally prescribed for handling such cases in a consistent manner. For example, for rasterizing triangles, one commonly used coverage rule provides that a triangle covers a pixel only if it covers the center point of the pixel.

Figure 1:
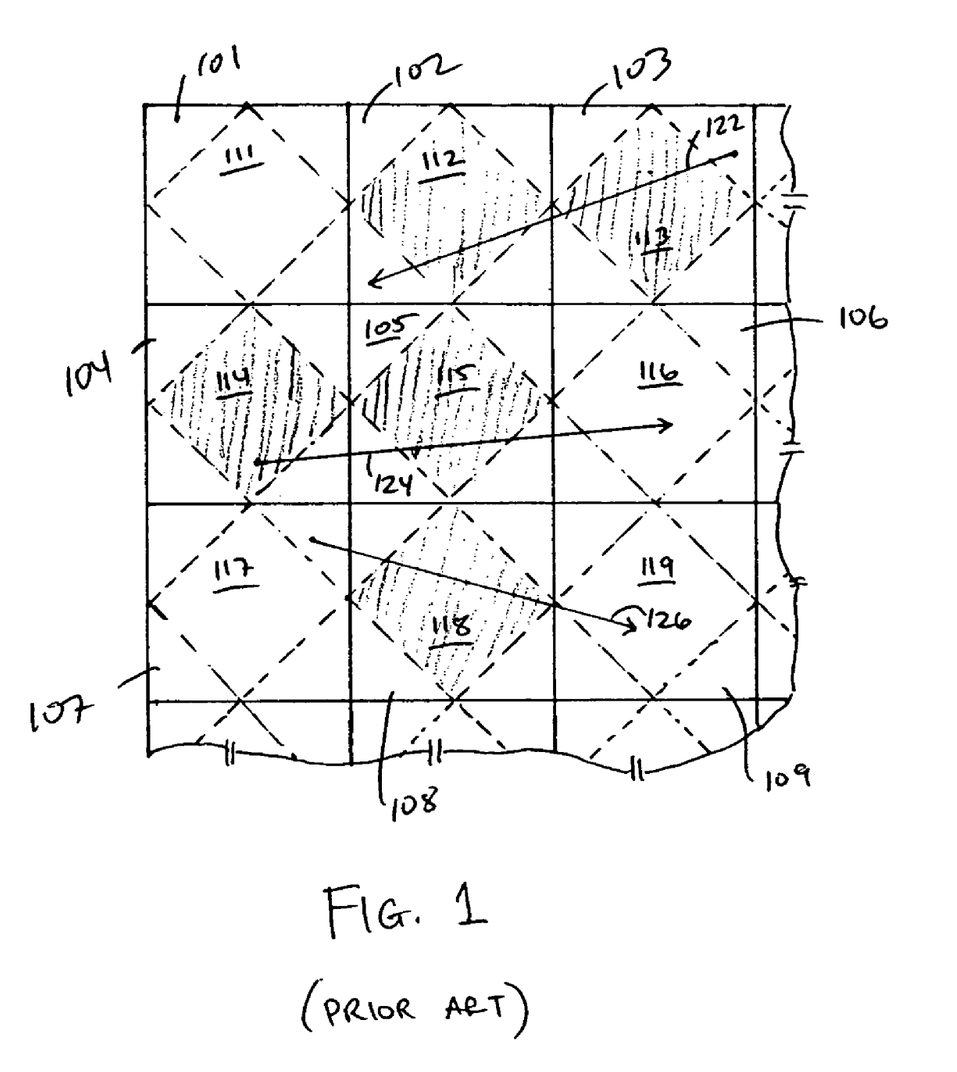
FIG. 1 illustrates a "diamond exit rule" for rasterizing lines according to the OpenGL standard.

For rasterizing lines, a center coverage rule is usually not optimal, and other rules are often used instead. For instance, the widely used OpenGL standard specifies a "diamond exit rule," illustrated in FIG. 1. Each pixel 101-109 has a diamond 111-119 (dashed lines) inscribed therein, centered on the pixel center. A line to be rasterized is defined by specifying a start vertex and an end vertex. According to the diamond exit rule, the line covers (or "hits") the pixel and should be drawn in that pixel only if the line (going from start vertex to end vertex) exits the diamond for that pixel. For instance, FIG. 1 shows three lines 122, 124, 126, with the direction of drawing for each line indicated by an arrowhead. Line 122 hits pixels 103 and 102 because it exits diamonds 113 and 112. (Hit pixels are indicated by shaded diamonds in FIG. 1.) Line 124 hits pixels 104 and 105 but not pixel 106 because it enters diamond 116 but does not exit. Line 126 hits only pixel 108 because it exits only diamond 118. It should be noted that the diamond exit rule is dependent on the direction of drawing; for example, if line 126 were drawn in the other direction, it would hit both of pixels 109 and 108. Small lines might not exit any diamonds; such lines would not be visible on the screen.

Complex images, such as those typically found in 3D video games or other applications, involve a very large number of primitives, and one of the factors that limits rendering speed is the time needed for the rasterizer to process all of the primitives. Thus, rendering pipelines usually include a culling stage intended to reduce the number of primitives that the rasterizer processes. For example, it is common to define a view frustum that bounds a visible region of the 3D space. Any primitive that lies entirely outside this region will not be seen and can be culled from the geometry data prior to rasterization.

But some primitives inside the view frustum could also be culled, at least in theory, because they turn out not to cover any pixels. For example, a small triangle might not cover any pixel centers, or a short line might not exit any diamonds. Such primitives are invisible, having no effect on the rendered image. Existing culling techniques generally do not systematically identify or cull such primitives, due in part to a lack of computationally efficient ways to identify and cull all such primitives without also culling some primitives that should be drawn. Thus, the rasterizer may process a significant number of primitives that do not actually cover any pixels, which results in slower rendering.

It would therefore be desirable to provide improved culling techniques for identifying and eliminating invisible small primitives.

BRIEF SUMMARY OF THE INVENTION

Embodiments of the present invention provide devices and methods for culling small primitives that do not cover (or hit) any pixels during pixel generation. A boundary, such as a diamond, is defined around a pixel center, with pixel coverage being determined for at least some types of primitives based on whether the boundary is crossed. The boundaries divide the raster into internal regions and external regions, and each region is assigned a unique canonical identifier. Each vertex of a primitive is assigned the canonical identifier corresponding to the region in which that vertex is located. One or more culling rules based on the canonical coordinates of the vertices is then applied to cull primitives that do not satisfy the boundary crossing rules. Small lines and polygons can be culled based on the canonical location identifiers of their vertices. Such culling may occur at any point after screen locations of the vertices have been determined.

According to one aspect of the present invention, a method for culling small primitives from geometry data to be rasterized onto an array of pixels in a graphics processing system is provided. The pixel array is divided into a number of internal regions and a number of external regions, where each internal region corresponds to an area of the pixel array that includes a center point of one of the pixels and where each external region corresponds to an area of the pixel array between internal regions. A unique canonical location identifier is defined for each of the internal and external regions. A primitive having a plurality of vertices is received. One of the canonical location identifiers is assigned to each vertex of the primitive; the assigned identifier identifies the region of the pixel array that contains the vertex. Based on the respective canonical location identifiers of each vertex, it is determined whether the primitive satisfies a visibility rule defined with reference to a boundary crossing between an internal region and an external region. The primitive is culled in the event that the primitive does not satisfy the visibility rule. In some embodiments, the act of culling occurs prior to generation of edge equations for visible primitives.

In one embodiment, the visibility rule relates to a diamond exit rule. Accordingly, the internal regions may include substantially diamond shaped regions, with each diamond shaped internal region being centered on a pixel center, and the external regions may also include substantially diamond shaped regions, with each diamond shaped external region being centered on an intersection point of edges of a pixel. The canonical location identifier for each region may includes a type indicator having a first state for indicating that the region is an internal region and a second state for indicating that the region is an external region, as well as screen coordinates for the region. For a diamond shaped external region, screen coordinates of the intersection point on which the diamond shaped external region is centered may be used, and for a diamond shaped internal region, screen coordinates of a corner of the pixel on whose center point the diamond shaped internal region is centered may be used. Where the primitive is a line having a start vertex and an end vertex, the line may be culled in the event that either (i) the start vertex and the end vertex are both in the same region or (ii) the start vertex is in an external region and the end vertex is in an adjacent internal region. Where the primitive is a polygon, it may be culled in the event that all of the vertices are in the same external region.

According to another aspect of the present invention, a device for rendering geometry data for an image onto a pixel array may include a canonical coordinate module, culling logic, and a raster conversion module. The canonical coordinate module is coupled to receive vertices of primitives of the geometry data and configured to compute a canonical location identifier for each vertex. The canonical location identifier uniquely identifies one of a number of regions within the pixel array, where the regions include a number of internal regions that each include a center point of one of the pixels and a number of external regions that each correspond to an area of the pixel array between internal regions. The culling logic is coupled to the canonical coordinate module and configured to apply a visibility rule to each of the primitives using the canonical location identifiers of the vertices of the primitive and to cull the primitive in the event that the visibility rule is not satisfied. The visibility rule is defined with reference to a boundary crossing between an internal region and an external region. The raster conversion module is coupled to receive primitives that are not culled and configured to generate pixel data from the received primitives.

In some embodiments, the device may also include a geometry transformation module coupled to receive geometry data from a data source. The transformation module may be configured to transform vertices included in the geometry data to screen coordinates and to provide the transformed geometry data to the canonical coordinate module, and the canonical coordinate module may be further configured to operate using the screen coordinates.

In some embodiments, the raster conversion module may include a setup unit and a rasterizer. The setup unit may be configured to generate one or more edge equations for each primitive that is not culled. The rasterizer may be configured to determine coverage of a pixel by a primitive based at least in part on the one or more edge equations received from the setup unit.

The following detailed description together with the accompanying drawings will provide a better understanding of the nature and advantages of the present invention.

DETAILED DESCRIPTION OF THE INVENTION

Embodiments of the present invention provide devices and methods for culling small primitives that do not cover (or hit) any pixels during pixel generation, based on boundaries defined around pixel centers that divide the pixel raster into internal regions and external regions, with each region being assigned a unique canonical identifier. Each vertex of a primitive is assigned the canonical identifier corresponding to the region in which that vertex is located, and culling rules are defined with reference to the canonical coordinates of the vertices. Small lines and polygons can be culled based on the canonical location identifiers of their vertices. Such culling may occur at any point after screen locations of the vertices have been determined. Culling is advantageously implemented in a graphics rendering pipeline, which may be integrated into a graphics processor of a computer system.

Figure 2:
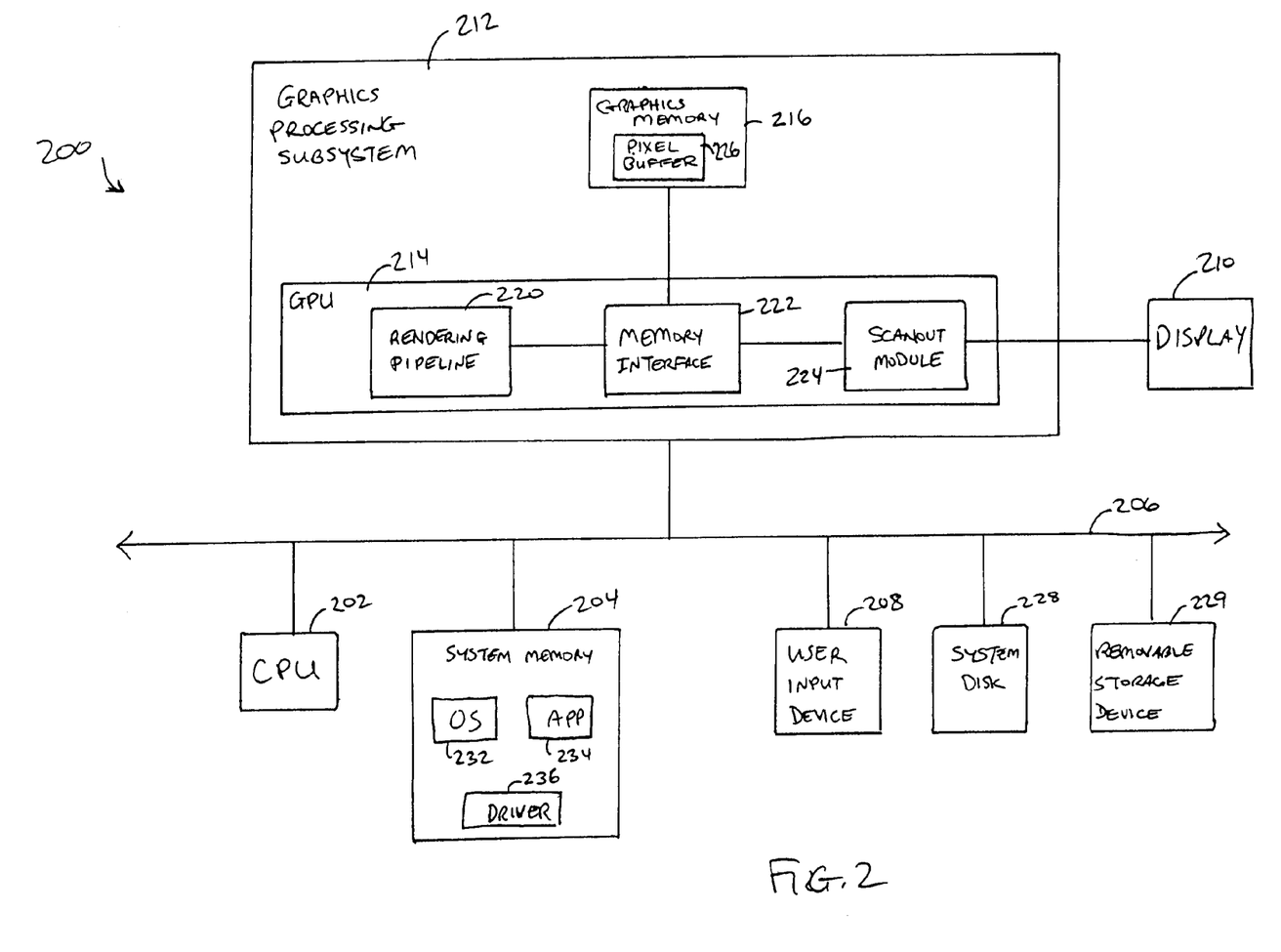
FIG. 2 is a block diagram of a computer system according to an embodiment of the present invention.

FIG. 2 is a block diagram of a computer system 200 according to an embodiment of the present invention. Computer system 200 includes a central processing unit (CPU) 202 and a system memory 204 communicating via a bus 206. User input is received from one or more user input devices 208 (e.g., keyboard, mouse) coupled to bus 206. Visual output is provided on a pixel based display device 210 (e.g., a conventional CRT or LCD based monitor) operating under control of a graphics processing subsystem 212 coupled to system bus 206. A system disk 228 and other components, such as one or more removable storage devices 229 (e.g., floppy disk drive, compact disk (CD) drive, and/or DVD drive), may also be coupled to system bus 206. System bus 206 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 212 includes a graphics processing unit (GPU) 214 and a graphics memory 216, which may be implemented, e.g., using one or more integrated circuit devices such as programmable processors, application specific integrated circuits (ASICs), and memory devices. GPU 214 includes a rendering pipeline 220, a memory interface module 222, and a scanout module 224. Rendering pipeline 220 may be configured to perform various tasks related to generating pixel data from graphics data supplied via system bus 206 (e.g., implementing various 2D and or 3D rendering algorithms), interacting with graphics memory 216 to store and update pixel data, and the like. Rendering pipeline 220 is advantageously configured to generate pixel data from 2D or 3D scene data provided by various programs executing on CPU 202. Operation of rendering pipeline 220 is described further below.

Memory interface module 222, which communicates with rendering pipeline 220 and scanout control logic 224, manages all interactions with graphics memory 216. Memory interface module 222 may also include pathways for writing pixel data received from system bus 206 to graphics memory 216 without processing by rendering pipeline 220. The particular configuration of memory interface module 222 may be varied as desired, and a detailed description is omitted as not being critical to understanding the present invention.

Graphics memory 216, which may be implemented using one or more integrated circuit memory devices of generally conventional design, may contain various physical or logical subdivisions, such as a pixel buffer 226. Pixel buffer 226 stores pixel data for an image (or for a part of an image) that is read and processed by scanout control logic 224 and transmitted to display device 210 for display. This pixel data may be generated, e.g., from 2D or 3D scene data provided to rendering pipeline 220 of GPU 214 via system bus 206 or generated by various processes executing on CPU 202 and provided to pixel buffer 226 via system bus 206. In some embodiments, pixel buffer 226 can be double buffered so that while data for a first image is being read for display from a "front" buffer, data for a second image can be written to a "back" buffer without affecting the currently displayed image. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 226 and transfers the data to display device 210 to be displayed. In one embodiment, scanout module 224 operates isochronously, scanning out frames of pixel data at a prescribed refresh rate (e.g., 80 Hz) regardless of any other activity that may be occurring in GPU 214 or elsewhere in system 200. In some embodiments, the prescribed refresh rate can be a user selectable parameter, and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown). In some embodiments, scanout module 224 may also rescale images (e.g., enlarging or reducing), e.g., by interpolating pixel data from pixel buffer 226.

During operation of system 200, CPU 202 executes various programs that are (temporarily) resident in system memory 204. In one embodiment, these programs include one or more operating system (OS) programs 232, one or more application programs 234, and one or more driver programs 236 for graphics processing subsystem 212. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 228, and/or in other storage space.

Operating system programs 232 and/or application programs 234 may be of conventional design. An application program 234 may be, for instance, a video game program that generates graphics data and invokes appropriate rendering functions of GPU 214 (e.g., rendering pipeline 220) to transform the graphics data to pixel data. Another application program 234 may generate pixel data and provide the pixel data to graphics processing subsystem 212 for display. It is to be understood that any number of application programs that generate pixel and/or graphics data may be executing concurrently on CPU 202. Operating system programs 232 (e.g., the Graphical Device Interface (GDI) component of the Microsoft Windows operating system) may also generate pixel and/or graphics data to be processed by graphics card 212.

Driver program 236 enables communication with graphics processing subsystem 212, including both rendering pipeline 220 and scanout module 224. Driver program 236 advantageously implements one or more standard application program interfaces (APIs), such as Open GL, Microsoft DirectX, or D3D for communication with graphics processing subsystem 212; any number or combination of APIs may be supported, and in some embodiments separate driver programs 236 are provided to implement different APIs. By invoking appropriate API function calls, operating system programs 232 and/or application programs 234 are able to instruct driver program 236 to transfer geometry data or pixel data to graphics card 212 via system bus 206, to control operations of rendering pipeline 220, to modify state parameters for scanout module 224 and so on. The specific commands and/or data transmitted to graphics card 212 by driver program 236 in response to an API function call may vary depending on the implementation of GPU 214, and driver program 236 may also transmit commands and/or data implementing additional functionality (e.g., special visual effects) not controlled by operating system programs 232 or application programs 234. Various techniques for managing communication between driver program 236 and graphics processing subsystem 212 are known in the art and may be used, including asynchronous techniques.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, the GPU may be incorporated into a variety of devices, including general purpose computer systems, video game consoles and other special purpose computer systems, DVD players, and the like.

Figure 3:
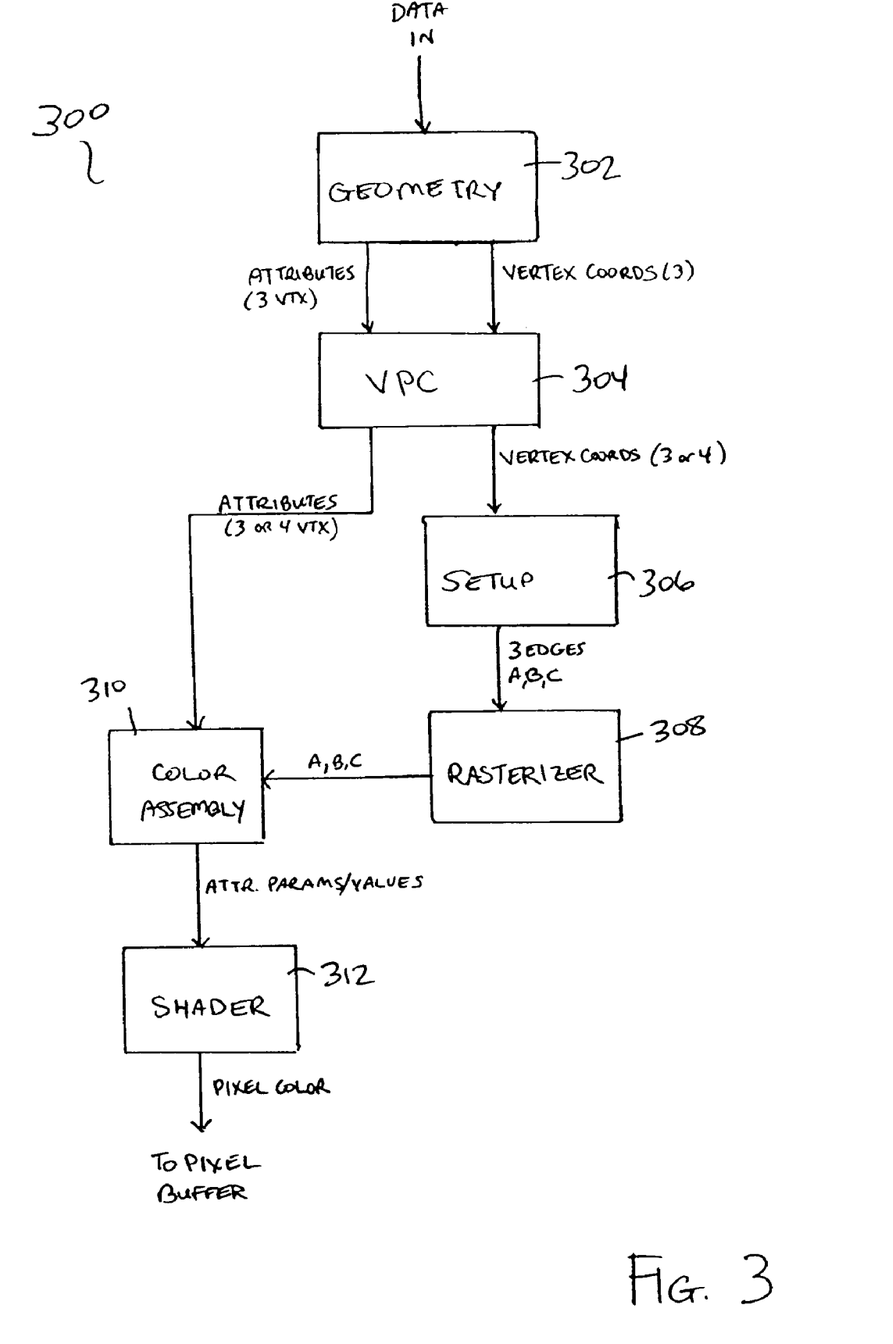
FIG. 3 is a block diagram of a 3D rendering pipeline according to an embodiment of the present invention.

Rendering pipeline operations, including culling of small primitives according to an embodiment of the present invention, will now be described. FIG. 3 is a block diagram of a 3D rendering pipeline 300 according to an embodiment of the present invention. Pipeline 300 may be implemented in rendering pipeline 220 in GPU 214 described above. Pipeline 300 includes a geometry block 302, a viewport and culling (VPC) block 304, a setup block 306, a rasterizer 308, a color assembly block 310, and a shader 312.

Geometry block 302, which may be of generally conventional design, receives a geometric representation of a 3D scene to be rendered. In one embodiment, the scene data includes a number of object definitions for objects (e.g., a table, a chair, a person or animal) that may be present in the scene. Each object is advantageously represented as a primitive (e.g., a triangle, a line) or a group of primitives by specifying vertex locations of the primitives in an object coordinate system. In addition to a location, each vertex also has various attributes associated with it. In general, attributes of a vertex may include any property that is specified on a per-vertex basis. In one embodiment, attributes include red, green, and blue color components; a transparency parameter; and texture coordinates relating the vertex location to a texture map.

Since each object may have its own coordinate system, additional data or commands are advantageously provided to position the objects relative to each other within a world coordinate system, e.g., by specifying a transformation matrix for each object from object coordinates to a common "world" coordinate system. The transformation matrix of an object is applied to each of its vertices. World coordinates may be further transformed to a viewing space in 3D homogeneous coordinates (x, y, z, w). The origin of the viewing coordinate system is advantageously defined to coincide with an eyepoint, the z axis to coincide with the view direction, and the y axis to coincide with an "up" vector. The w axis is defined such that points with w>0 are in front of the eyepoint; points with w<0 are behind the eyepoint. In other embodiments, other coordinate systems may also be used.

Geometry block 302 is configured to transform the object coordinates of each vertex to viewing coordinates (e.g., using conventional modeling transformations) and may also perform other transformations, such as lighting transformations, generation of shadow volumes, and the like; such operations may be performed in object, world, or viewing coordinates as appropriate. Numerous examples of "per-vertex" operations that may be implemented in geometry block 302 are known in the art, and a detailed description is omitted as not being critical to understanding the present invention.

Geometry block 302 provides the transformed geometry data, in viewing coordinates, to VPC block 304. In one embodiment, the transformed geometry data includes primitives such as triangles and lines. Each primitive is defined by specifying an appropriate number (e.g., three for triangles, two for lines) of vertex locations in 2D or 3D homogeneous viewing coordinates. Groups of primitives may also be defined; for instance, a list of vertices describing a triangle strip or fan may be provided as known in the art, with some vertices being included in multiple triangles. Similarly, a connected group of lines may be specified as a list of vertices, with lines being drawn from one vertex to the next.

VPC block 304 may further transform the primitives from viewing coordinates to a screen space, which is advantageously defined using 3D inhomogeneous coordinates (X, Y, Z), where the (X, Y) coordinates correspond to the pixel array (raster) and Z is a depth coordinate along the viewing direction. In one embodiment, the transformation is defined by a scaling vector ($vs_x$, $vs_y$, $vs_z$) and an offset vector ($vb_x$, $vb_y$, $vb_z$), so that a point with clip coordinates (x, y, z, w) transforms to screen coordinates:

$$(X, Y, Z) = (vs_x, vs_y, vs_z) \cdot (x/w, y/w, z/w) + (vb_x, vb_y, vb_z),$$ (Eq. 1)

where ·denotes a vector dot product. Alternatively, the screen coordinates may be 2D inhomogeneous coordinates (X, Y) corresponding to the pixel raster for the image, with the Z (depth) coordinate of each vertex preserved as an attribute. In some embodiments, both the clip coordinates and the screen coordinates are kept for each vertex, enabling downstream components to use either (or both) coordinate systems as desired. In some embodiments, VPC block 304 may also transform attributes (e.g., by scaling attribute values by 1/w) as appropriate. It should be noted that the "screen" coordinates used by VPC block 304 advantageously correspond to the pixel array defined for pixel buffer 226, which need not correspond to a pixel array of a particular display device.

VPC block 304 also identifies and culls various invisible primitives. For example, any primitives that are entirely outside a visible region of the viewing space may be culled. As is known in the art, the visible region may be defined with respect to one or more planes of a view frustum or other criteria (e.g., primitives where all vertices have w<0 can be culled). If desired, VPC block 304 may also cull back-facing primitives (i.e., those that face away from the viewer); conventional techniques for identifying such primitives may be used.

Figure 4:
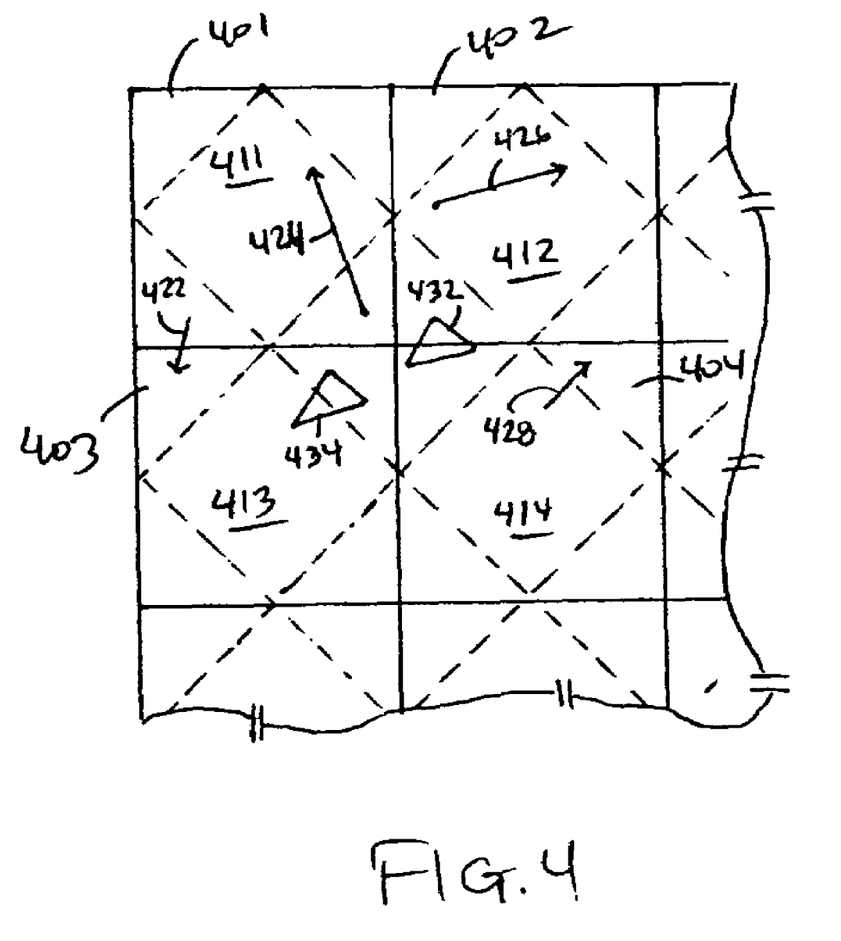
FIG. 4 illustrates small primitives that might be culled according to an embodiment of the present invention.

In accordance with an embodiment of the present invention, VPC block 304 also culls small lines and polygons that are within the viewable volume but do not cover (or hit) any pixels. For example, FIG. 4 illustrates small primitives that might be culled by VPC block 304 using "diamond culling" rules based on the coverage rules of OpenGL. Pixels 401-404 are shown with respective diamonds 411-414 inscribed therein. The inscribed diamonds are centered on the respective pixel centers. (It is to be understood that inscribed diamonds (dashed lines) and pixel boundaries (solid grid) in the drawings herein are shown for reference and are not part of the image.) Lines 422, 424, 426, and 428 are specified in the geometry data as being drawn in the direction shown by the arrowheads. None of lines 422, 424, 426 exits any diamonds, and these three lines can be culled by VPC block 304. Line 428 exits diamond 414 and therefore should not be culled. Specific techniques for implementing diamond culling are described below.

Any primitives that are culled are not processed at subsequent processing stages. In some embodiments, data for culled primitives is dropped. In other embodiments, rather than dropping the data, a "cull flag" may be used. The cull flag is asserted (set to logical true) for each primitive culled by VPC block 304. Setting the cull flag for a primitive to logical true signals downstream processing stages to ignore that primitive.

In addition to culling, VPC block 304 may also clip primitives that are partially outside the viewable volume. A variety of clipping techniques are known in the art and may be used; a detailed description is omitted as not being critical to understanding the present invention.

After the culling and clipping operations, VPC block 304 provides the resulting primitives to setup block 306. For each primitive it receives, setup block 306 computes edge equations for use by rasterizer 308 and selects vertices for use in computing attribute parameters (or attribute values) for pixels covered by the primitive the primitive. Any primitives that were culled by VPC block 304 either are not provided to setup block 306 or are ignored by it, e.g., based on assertion of the cull flag.

Setup block 306 provides the edge equations and the vertex list for each primitive that was not culled to rasterizer 308. Rasterizer 308 performs scan conversion on the received primitives (e.g., using the edge equations). Scan conversion generally involves determining which primitive is visible at each pixel and providing the ordered vertex list for that primitive to color assembly block 310. Conventional scan-conversion algorithms may be implemented, and rasterizer 308 may be implemented to use homogeneous viewing coordinates (e.g., so-called "clipless" rasterizers) or inhomogeneous screen coordinates. In either case, edge equations and vertex lists can be provided by setup block 306 in the appropriate coordinate space.

Rasterizer 308 may implement various rules for determining pixel coverage, such as the diamond exit rule of the OpenGL standard (in the case of lines) and a center-coverage rule (in the case of triangles or other polygons). The small-primitive culling techniques implemented in VPC block 304 are advantageously made consistent with the coverage rules, so that only primitives that do not cover any pixels are culled.

Color assembly block 310 associates the vertices received from rasterizer 308 with the attributes (e.g., color components, texture coordinates) received from VPC block 304 and generates parameters for computing attribute values at pixels covered by the primitive. Color assembly block 310 may use conventional techniques such as linear interpolation or barycentric weighting. These parameters, which can be used to interpolate the attribute value at any pixel within the primitive, are provided to shader 312. In some embodiments, color assembly block 310 may also compute attribute values for a given pixel for use by shader 312.

Shader 312 uses the parameters and/or attribute values received from color assembly block 310 to compute a pixel color that can be stored in a pixel buffer (e.g., buffer 226 of FIG. 2). Shader 312 may implement a variety of shading algorithms, including well-known algorithms such as Gouraud shading, Phong shading, texture blending, and the like. In some embodiments, a programmable shader 312 may be implemented and dynamically supplied with one or more shading algorithms.

It will be appreciated that rendering pipeline 300 is illustrative and that variations and modifications are possible. Various transformation, clipping, rasterization and shading techniques may be implemented without departing from the scope of the present invention. Primitives may include lines, triangles, and/or other polygons.

Specific techniques for diamond culling of small primitives according to an embodiment of the present invention will now be described. In the diamond culling process described herein, screen coordinates of the vertices of the line or triangle (or other polygon) are converted to "diamond coordinates" that are designed to support a computationally simple implementation of diamond culling rules, and the culling determination is made with reference to the diamond coordinates.

Figure 5:
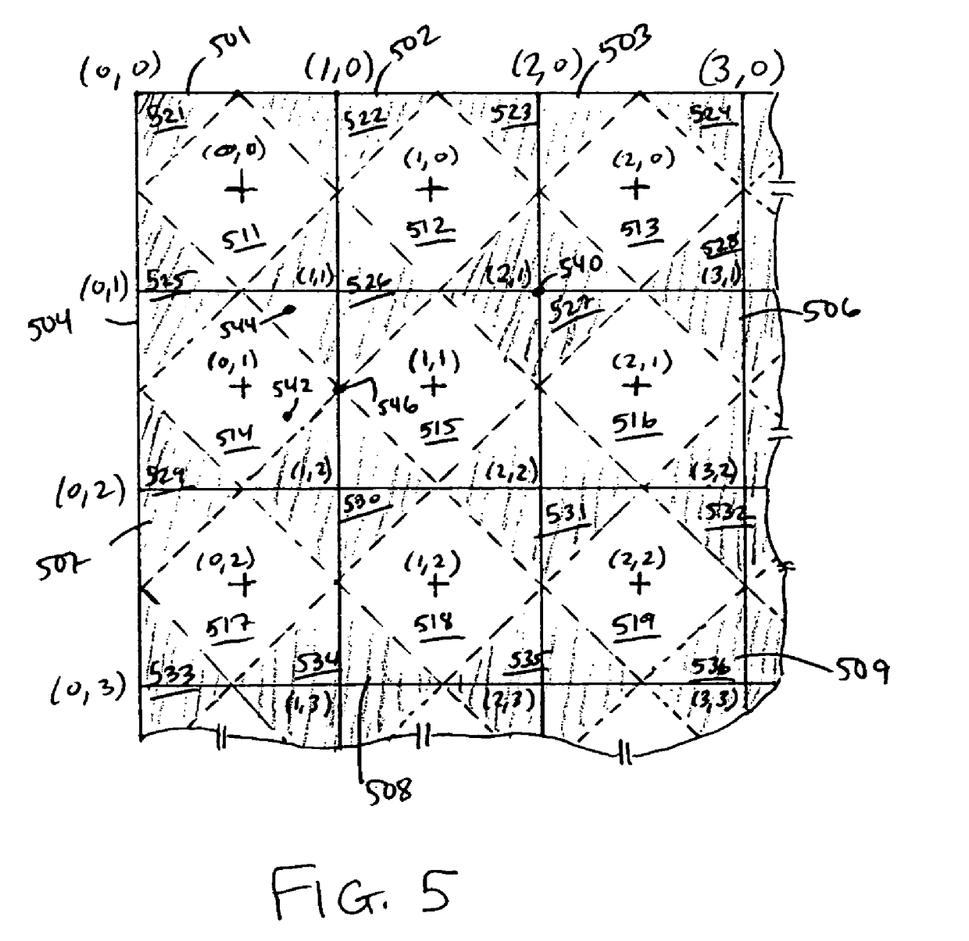
FIG. 5 illustrates an example of a diamond coordinate system according to an embodiment of the present invention.

FIG. 5 illustrates an example of a diamond coordinate system having coordinates (Dx, Dy) and a "type" identifier (represented by shading as described below) that may be defined for pixels 501-509 of a raster 500. The screen is divided into "internal" diamonds (unshaded regions) that contain pixel centers and "external" diamonds (shaded regions) that do not contain pixel centers. Specifically, each pixel 501-509 has an internal diamond 511-519 inscribed therein (inscribed diamonds are shown by dashed lines). The regions between internal diamonds 511-519 are external diamonds 521-536. Some of the external diamonds at the edges of the pixel array (e.g., external diamonds 521-524) are only partial diamonds; the term "external diamond" as used herein is intended to include such partial diamonds.

Any point within raster 500 can be classified as an internal or external point, depending on whether it is in an external diamond or an internal diamond. For example, point 542 is internal and point 544 is external. In one embodiment, points on diamond edges are classified as internal, in compliance with OpenGL definitions. In other embodiments, they might be classified as external, and in still other embodiments, points on some edges might be defined as internal while points on other edges are defined as external. Point 546 is a corner point. In some embodiments, corner points may constitute a third classification; in other embodiments, they may be classified as internal (or external) like any other edge point. Thus, each point can be assigned to one of a discrete number of types (e.g., Internal, External, or Corner) by use of a type identifier having a distinct value for each type (e.g., a two-bit identifier field might be used, with value "01" corresponding to Internal, "10" to External, and "11" to Corner).

The diamond coordinates (Dx, Dy) for a point, in conjunction with the type identifier, uniquely identify the diamond that contains the point. Accordingly, one diamond coordinate system assigns coordinates to the center of each internal and external diamond and uses the center coordinates as the diamond coordinates (Dx, Dy) for any point within a given diamond. FIG. 5 illustrates one assignment of coordinates to diamond centers. For external diamonds 521-536, integer screen coordinates that are assigned to each pixel corner coincide with the diamond centers and are used as the diamond coordinates. For example, point 540 is a pixel corner with screen coordinates (2, 1) and is the center of external diamond 527; accordingly, diamond 527 is assigned coordinates (2, 1) For internal diamonds 511-519, the screen coordinates of the upper left corner of the pixel are used. Thus, the (Dx, Dy) coordinates of internal diamond 511 are (0, 0), the coordinates of internal diamond 512 are (1, 0) and so on.

In this arrangement, it is generally the case that one external diamond and one internal diamond share diamond coordinates (Dx, Dy). For example, internal diamond 519 and external diamond 531 both have diamond coordinates (2, 2). Points in the two diamonds can be distinguished by reference to the type identifier described above; for instance, a point with diamond coordinates (2, 2) and type identifier of Internal is in diamond 519, while a point with diamond coordinates (2, 2) and type identifier of External is in diamond 531. In other embodiments, the diamond coordinates (Dx, Dy) for internal diamonds might be the screen coordinates of pixel centers. For instance, the center of pixel 509 is at screen coordinates (2.5, 2.5), so diamond 519 might be assigned diamond coordinates (2.5, 2.5). It will be appreciated that other modifications are also possible. The coordinate system may be extended to a raster with any number of pixels.

Figure 6:
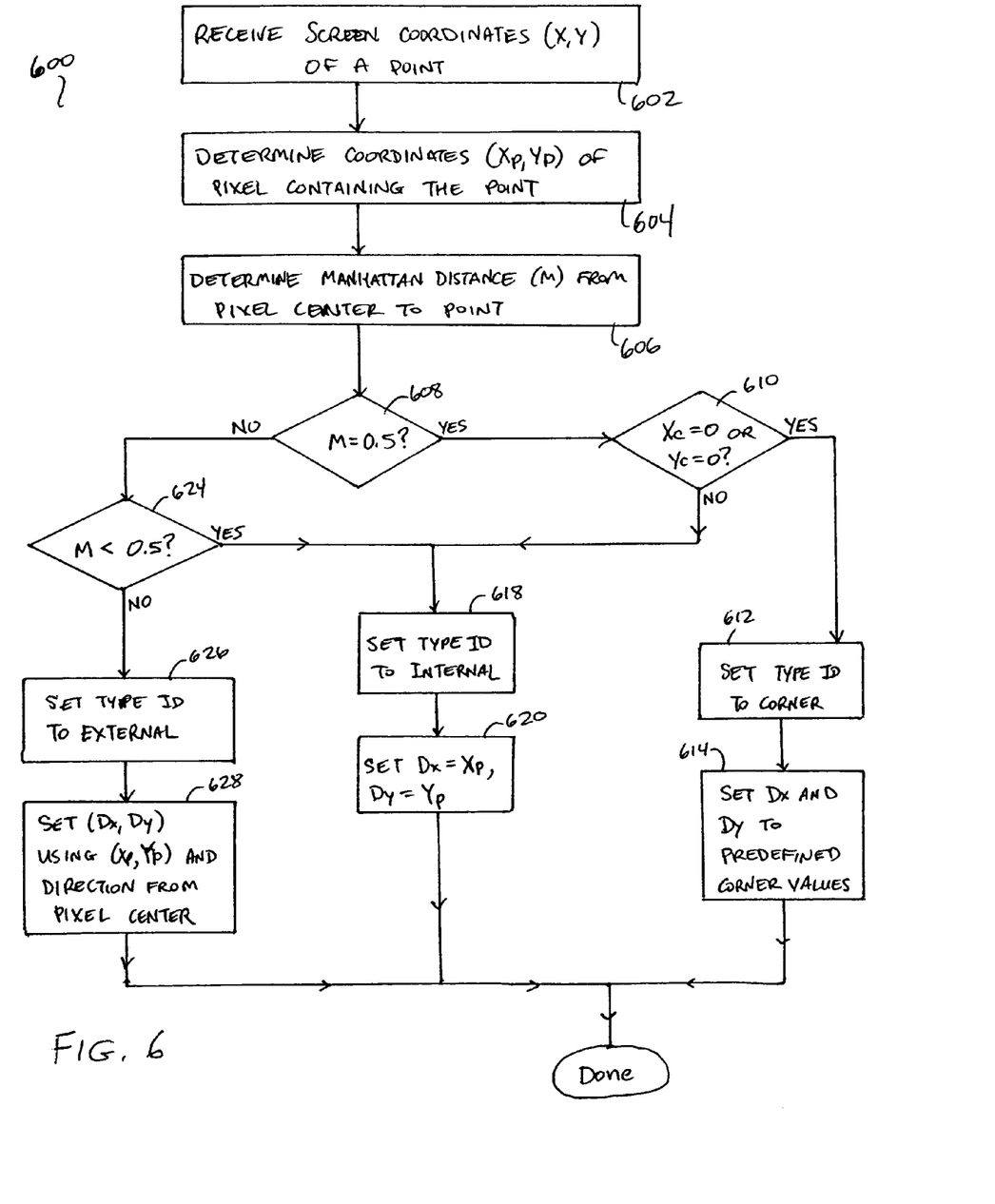
FIG. 6 is a flow diagram of a process for computing diamond coordinates in the diamond coordinate system of FIG. 5 according to an embodiment of the present invention.

FIG. 6 is a flow diagram of a process 600 for computing diamond coordinates (in the diamond coordinate system of FIG. 5) for a point P whose screen coordinates (X, Y) are known. At step 602, the screen coordinates (X, Y) of point P are received. The screen coordinates may be represented, e.g., using fixed-point real numbers.

At step 604, the coordinates (Xp, Yp) for the upper left corner of the pixel that contains point P are determined. For example, $$Xp=\text{floor}(X); Yp=\text{floor}(Y) \quad (\text{Eq. 2})$$

may be used, where floor(X) (floor(Y)) is a function that returns the nearest integer less than its argument X (Y).

At step 606, the Manhattan distance, in screen coordinates, from the pixel center to point P is computed. "Manhattan distance" between two points refers to the path length as measured along grid lines. For example, the distance may be computed by computing coordinate offsets Xc and Yc, which represent the (signed) distances along the X and Y axes, respectively between the pixel center and the point, then adding the magnitudes of these offsets Accordingly, if the pixel center for the pixel containing point P has screen coordinates (Xp+0.5, Yp+0.5), as in FIG. 5, then step 606 may include first computing coordinate offsets as:

$$Xc=X-(Xp+0.5); Yc=Y-(Yp+0.5), \quad (\text{Eq. 3})$$

then computing the Manhattan distance M as:

$$M=|Xc|+|Yc|. \quad (\text{Eq. 4})$$

As can readily be inferred from FIG. 5, points with M≦0.5 are in internal diamonds, and points with M>0.5 are in external diamonds. (Corner points have M=0.5 and also have Xc=0 or Yc=0). Process 600 uses the Manhattan distance M to classify the points and assign diamond coordinates.

Specifically, at step 608, it is determined whether the Manhattan distance M is equal to 0.5. If so, then at step 610 it is determined whether Xc or Yc is zero. If so, then at step 612 the point's type identifier is set to Corner. At step 614, the diamond coordinates (Dx, Dy) are set using a predetermined rule for corner points. In one embodiment, the pixel coordinates (Xp, Yp) computed at step 604 are used, but the coordinates of any of the diamonds for which the corner point is at a corner may be used. In embodiments where primitives with a corner vertex are not culled, culling is not affected by the choice of diamond coordinates (Dx, Dy) assigned to a corner point.

Referring again to step 610, a point with M=0.5 for which neither Xc nor Yc is zero is an edge point; in this embodiment, such points are in internal diamonds. At step 618, the point's type identifier is set to Internal. At step 620, the diamond coordinates are set to (Xp, Yp); in the convention of FIG. 5, (Xp, Yp) are the coordinates for the internal diamond that contains the point, as can be seen by considering point 542.

Referring again to step 608, for points where the Manhattan distance M is not equal to 0.5, process 600 proceeds to step 624, where it is determined whether M is less than 0.5. If so, then the point is in an internal diamond, and process 600 proceeds to step 618 for handling points in internal diamonds as described above. The remaining possibility at step 624 is that M is greater than 0.5, in which case the point is in an external diamond. The point's type identifier is set to External at step 626, and at step 628, diamond coordinates (Dx, Dy) are determined. From FIG. 5, it can be seen that the diamond coordinates of a point in an external diamond depend not only on which pixel contains the point, but also which quadrant of the pixel (i.e., which direction from the pixel center). For example, point 644 is in pixel 604 and has (Xp, Yp)=(0, 1) but is in external diamond 626, which has diamond coordinates (1, 1). Thus, computation of diamond coordinates (Dx, Dy) at step 628 also takes into account the quadrant, which can be determined, e.g., from the signs of coordinate offsets Xc and Yc computed above (Eq. 3). For example, step 628 may include computing:

$$Dx=Xp+\{Xc>0?1:0\} \quad (\text{Eq. 5})$$

and $$Dy=Yp+\{Yc>0?1:0\}, \quad (\text{Eq. 6})$$

where the expression {Xc>0?1:0} evaluates to 1 if Xc is greater than 0 and to 0 otherwise, and where Xc and Yc are given by Eq. 3 above.

It will be appreciated that the process for computing diamond coordinates described herein is illustrative and that variations and modifications are possible. Steps described as sequential may be executed in parallel, order of steps may be varied, and steps may be modified or combined. Particular computations described herein may be replaced by different computations. The process may also be modified for use with different diamond coordinate systems, and corner points might or might not have a separate type identifier value. If internal and external diamonds are distinguishable by their (Dx, Dy) coordinates, a type identifier is not necessary; however, such an identifier may be provided if desired. Diamond coordinates computed for a point may be cached for reuse in the event that a vertex appears in another primitive (e.g., in the case of connected lines or triangle strips or fans).

Examples of diamond culling logic using the diamond coordinates of FIG. 5 will now be described with reference to FIGS. 7 and 8. The diamond culling logic shown therein implements the following rules:

Rule 1: A line is culled if both vertices are in the same diamond (which may be external or internal).

Rule 2: A line that is not culled by Rule 1 is culled if its start vertex is in an external diamond and its end vertex is in a neighboring internal diamond.

Rule 3: A triangle is culled if all of its vertices are in the same external diamond.

It is to be understood that other culling logic implementing different or additional rules could also be provided.

Figure 7:
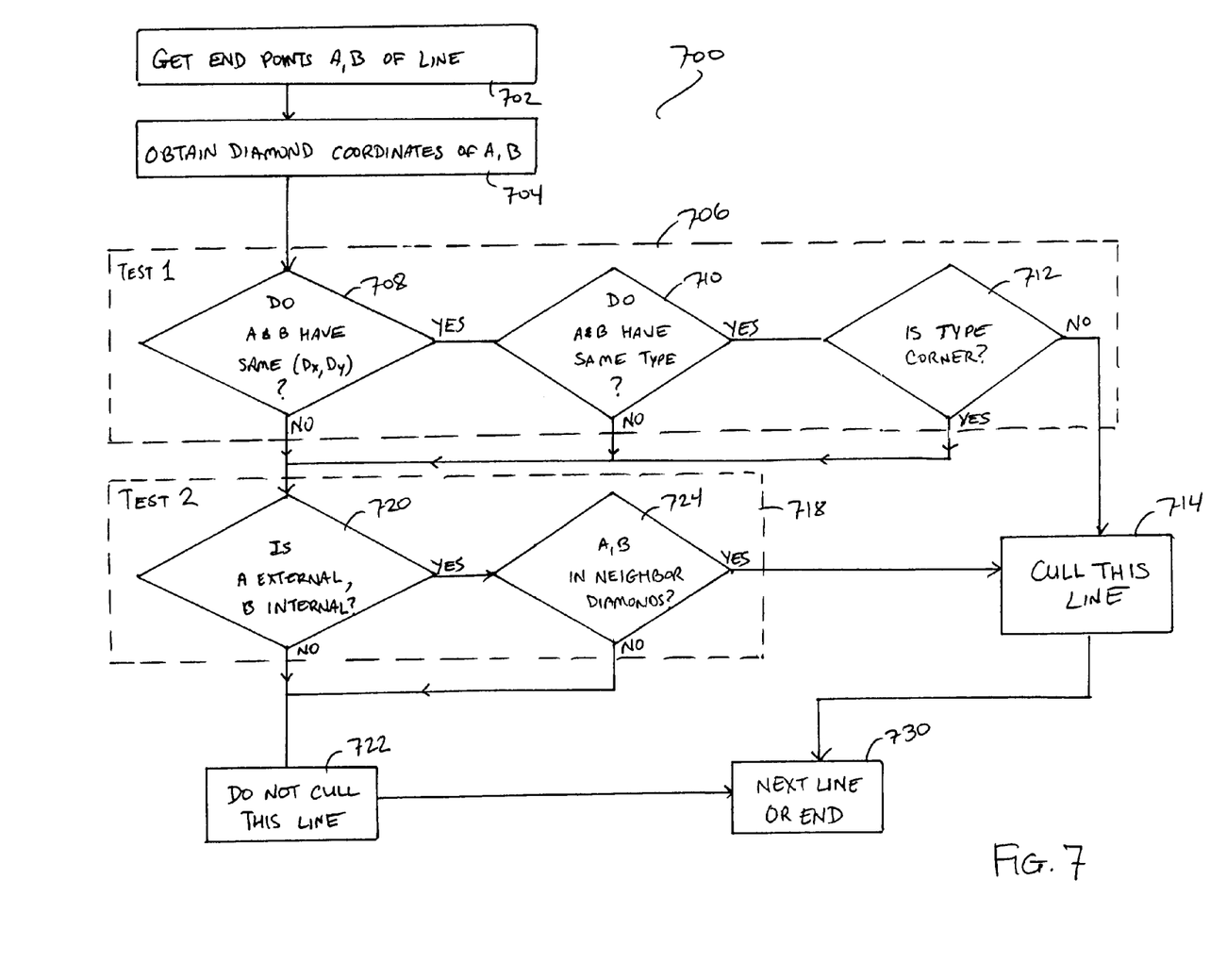
FIG. 7 is a flow diagram of a diamond culling process for lines according to an embodiment of the present invention.

FIG. 7 is a flow diagram of a culling process 700 for lines that implements Rules 1 and 2. At step 702, the vertices (endpoints) A and B for a line are received, with A being the start vertex and B being the end vertex, so that the line would be drawn in the direction from A to B. Diamond coordinates for each vertex are obtained (step 704), either by computation (e.g., process 600) or from a cached result of a previous computation.

A first test (dotted box 706) implements Rule 1. At step 708, it is determined whether vertices A and B have the same diamond coordinates (Dx, Dy). For instance, if A.Dx denotes the Dx coordinate of vertex A and so on, then the culling logic can determine whether A.Dx=B.Dx and A.Dy=B.Dy. If not, then A and B are not in the same diamond, and the line is not culled by Rule 1; process 700 proceeds to the test for Rule 2 (dotted box 718).

If the diamond coordinates (Dx, Dy) of vertices A and B are the same, then at step 710 it is determined whether both points are of the same type; e.g., whether A.Type=B. Type, where A. Type is the type identifier for vertex A. If not, then vertices A and B are not in the same diamond, and the line is not culled by Rule 1; process 700 proceeds to the test for Rule 2 (dotted box 718). It should be noted that step 710 is useful in embodiments where an internal diamond and an external diamond might have the same (Dx, Dy) coordinates (e.g., the diamond coordinate system of FIG. 5); if the coordinates (Dx, Dy) suffice to identify exactly one diamond, step 710 can be omitted.

In some embodiments, lines ending at corner points are not culled. Accordingly, at step 712, if vertices A and B are of the same type, a further test is done to check whether they are of Corner type. This can be done by checking the type identifier of either one of vertices A and B, since they were determined to be the same at step 710. If the checked vertex is not of Corner type, the line is culled (step 714), and process 700 either ends or returns to step 702 to process the next line (step 730). If the checked vertex is of Corner type, the line is not culled under Rule 1; process 700 proceeds to Rule 2 (dotted box 718). It should be noted that step 712 may be omitted if corner vertices are not identified as a distinct type.

If the line is not culled under Rule 1, a second test (dotted box 718) that implements Rule 2 is applied. At this stage, it is known that vertices A and B are not in the same diamond, and it remains to determine whether A is in an external diamond while B is in a neighboring internal diamond. At step 720, the respective types of vertices A and B are checked to determine whether vertex A is of External type while vertex B is of Internal type. If not, then the line from A to B is not culled under Rule 2 (step 722) and process 700 ends or processes the next line (step 730).

If, at step 720, vertex A is of External type and vertex B is of Internal type, then at step 724, it is determined whether vertices A and B are in neighboring diamonds. For the coordinate system of FIG. 5, the neighbors of an external diamond are the internal diamonds whose coordinates (Dx, Dy) are either the same or one less than the coordinates of the external diamond. For example, external diamond 630 has coordinates (1, 2); its neighboring internal diamonds 614, 615, 618, and 617 have coordinates (0, 1), (1, 1), (1, 2) and (0, 2) respectively. More generally, for the coordinate system of FIG. 5, if:

$$\Delta X = A.Dx - B.Dx, \quad \text{(Eq. 7)}$$

and $$\Delta Y = A.Dy - B.Dy, \quad \text{(Eq. 8)}$$

then the respective diamonds containing A and B are neighbors if:

$$\Delta X = (0 \text{ or } 1) \text{ AND } \Delta Y = (0 \text{ or } 1). \quad \text{(Eq. 9)}$$

This test may be applied at step 724.

If vertices A and B are determined to be in neighboring diamonds at step 724, then the line is culled by Rule 2 (step 714); otherwise the line is not culled (step 722). In either case, process 700 then ends or processes the next line (step 730).

It will be appreciated that this line culling process is illustrative and that variations and modifications are possible. Steps described as sequential may be executed in parallel, order of steps may be varied, and steps may be modified or combined. In some embodiments, process 700 may be implemented in pipelined fashion so that different steps may be executed concurrently for different lines. Other diamond culling rules may be implemented in addition to or instead of those described herein.

Figure 8:
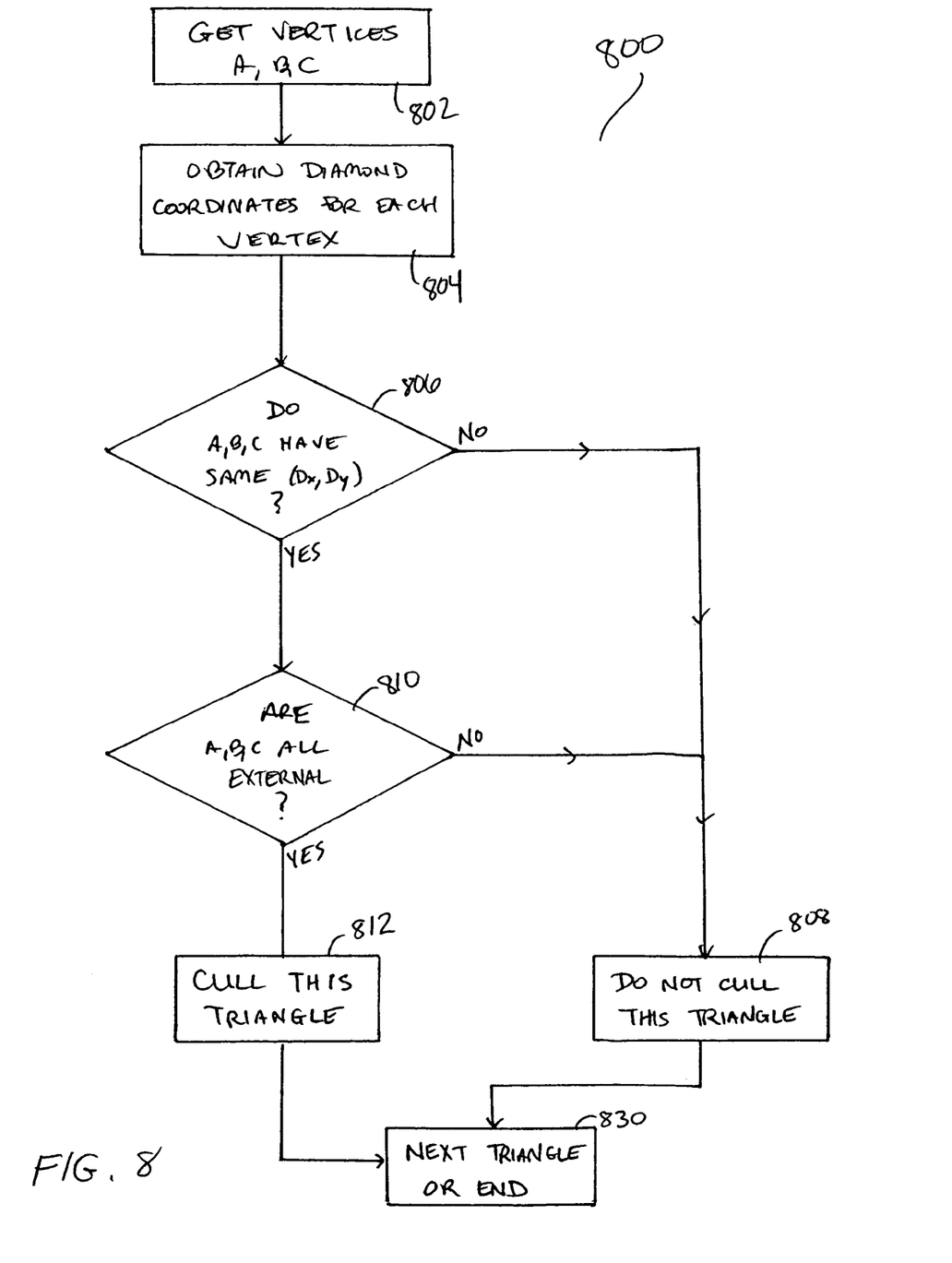
FIG. 8 is a flow diagram of a diamond culling process for triangles according to an embodiment of the present invention.

FIG. 8 is a flow diagram of a process 800 for diamond culling of triangles that implements Rule 3 described above. At step 802, three vertices A, B and C for a triangle are received. Diamond coordinates for each vertex are obtained (step 804), either by computation (e.g., process 600) or from a cached result of a previous computation.

At step 806, it is determined whether all three vertices have the same diamond coordinates (Dx, Dy). For example, it can be tested whether A.Dx=B.Dx; A.Dy=B.Dy; A.Dx=C.Dx and A.Dy=C.Dy (note that vertices B and C need not be tested against each other if both are tested against vertex A). If this condition is not satisfied, then the vertices are in different diamonds and are not culled (step 808); process 800 then exits or proceeds to the next triangle (step 830).

If the vertices all have the same diamond coordinates (Dx, Dy), then at step 810 it is determined whether all three are of External type. If not, then it is possible that the triangle might cover a pixel center, and the triangle is not culled (step 808). Otherwise, the triangle is culled (step 812). In either case, process 800 can then exit or proceed to the next triangle (step 830).

It will be appreciated that this triangle culling process is illustrative and that variations and modifications are possible. Steps described as sequential may be executed in parallel, order of steps may be varied, and steps may be modified or combined. In some embodiments, process 800 may be implemented in a pipelined fashion so that different steps may be executed concurrently for different triangles. The process may also be adapted for processing primitives with more than three vertices. It should be noted that culling according to Rule 3 does not necessarily cull all triangles that do not cover any pixel centers. For example, FIG. 4 shows a triangle 434 that does not cover any pixel centers but would not be culled by process 800. In some embodiments, additional culling logic might be implemented to cull such triangles; e.g., if the pixel coordinates (Xp, Yp) of Eq. 2 and coordinate offsets Xc and Yc of Eq. 3 are also available to the culling logic, triangles with all vertices in the same quadrant of a pixel might also be culled. Those of skill in the art will appreciate that implementation of such additional culling rules in a graphics processing chip generally involves various design tradeoffs between increased rasterizing speed due to reduction in the number of primitives and chip area and time costs due to increased complexity of the culling logic.

Figure 9:
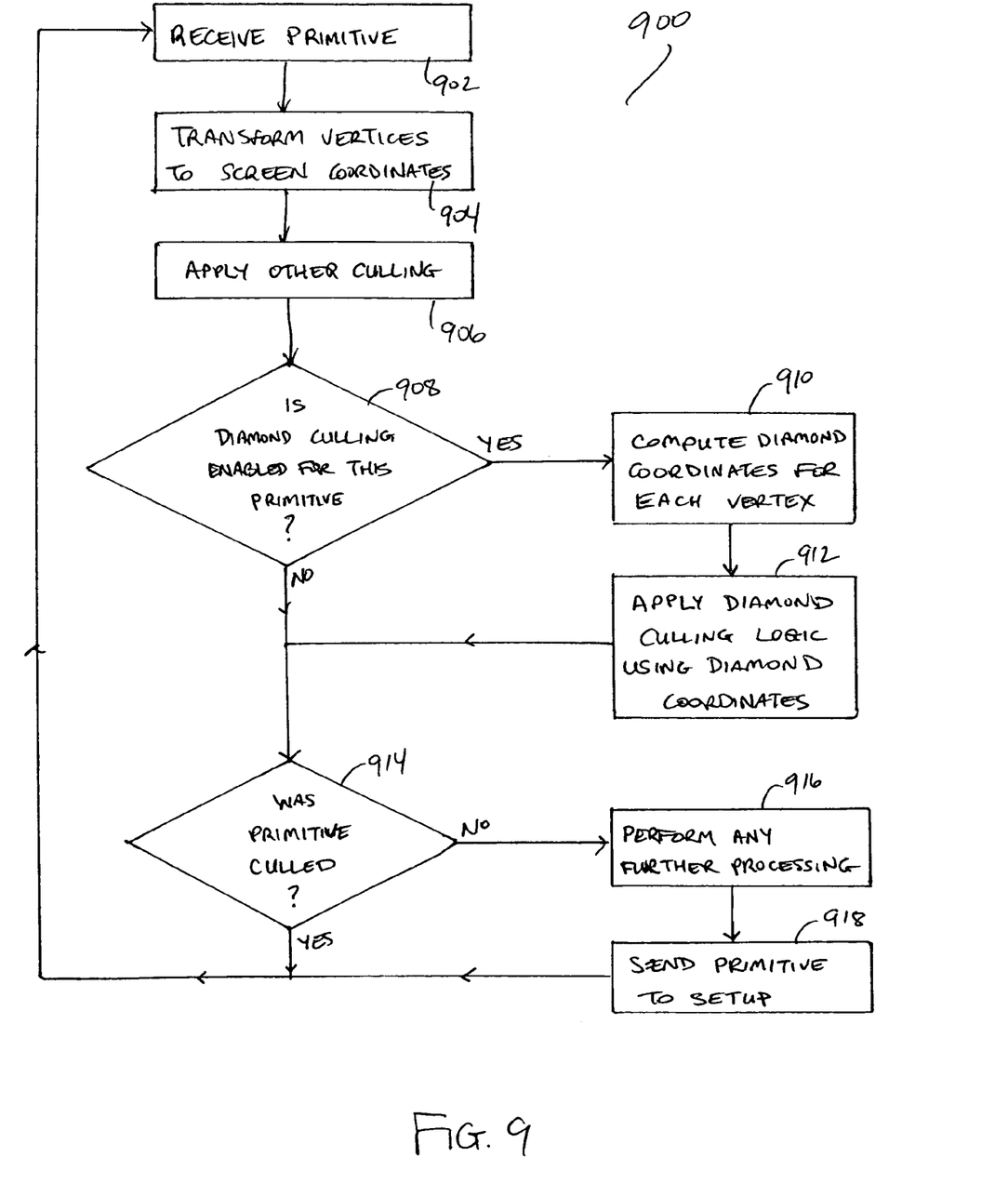
FIG. 9 is a flow diagram illustrating an operating process for a culling block of a rendering pipeline incorporating diamond culling according to an embodiment of the present invention.

Diamond culling logic of FIGS. 7 and 8 is advantageously implemented in VPC block 304 of the rendering pipeline of FIG. 3. FIG. 9 is a flow diagram illustrating an operating process 900 for VPC block 304 that incorporates the diamond culling logic described above. At step 902, a primitive (e.g., a line or a triangle) is received from geometry block 302. In general, receiving a primitive includes receiving vertices in world coordinates.

At step 904, VPC block 304 transforms the vertices to screen space coordinates, e.g., as described above. The screen coordinates are advantageously defined such that integer values of (X, Y) coordinates correspond to pixel edges. The transformed coordinates may be added to the vertex data (rather than replacing the untransformed coordinates) so that downstream components can have access to the untransformed coordinates.

At step 906, other culling (e.g., culling of primitives that are entirely outside the viewable volume) may be performed. For example, VPC block 304 may be provided with one or more bounding planes for a view frustum and may eliminate any primitives that are entirely outside the frustum. In addition, in some embodiments, back-facing primitives may also be culled. Conventional techniques may be used for such culling.

Thereafter, diamond culling is performed. As described above, diamond culling eliminates primitives that are in the viewable area but do not satisfy coverage tests for any pixels. In some embodiments, a per-primitive option for enabling or disabling diamond culling is provided, and at step 908 it is determined whether diamond culling is enabled for this primitive. Disabling diamond culling may be desirable in situations where primitives that fail the diamond culling test may nevertheless affect the displayed image. For example, some stippling algorithms known in the art might be adversely affected if a segment is missing from a line strip; where such algorithms are to be applied to a line strip, diamond culling may advantageously be disabled for lines in that strip. As another example, openGL-compliant embodiments support "aliased" and "smooth" (antialiased) lines; depending on the implementation of the antialiasing, it may be desirable to apply diamond culling only to aliased lines.

More generally, whether diamond culling should be enabled or disabled for a particular primitive depends in part on the rasterization algorithm to be used for that line. For instance, some embodiments may include a clipless rasterizer that operates in homogeneous coordinates; as is known in the art, clipless rasterizers may project vertices that are behind the eyepoint (at negative w) onto the screen to define "external" primitives. Screen coordinates of the vertices of an external primitive do not reflect the primitive's actual location; accordingly, it may be desirable to disable diamond culling for any primitive that has one or more negative-w vertices.

If diamond culling is enabled for this primitive, then at step 910, diamond coordinates are computed for each vertex, e.g., in accordance with process 600 described above. At step 912, the culling logic is applied, e.g., in accordance with process 700 (for lines) or 800 (for triangles) as described above.

Thereafter, at step 914, it is determined whether the primitive was culled. If so, the primitive is not to be processed by subsequent pipeline stages (e.g., it may be discarded or have a cull flag asserted as described above), and process 900 returns to step 902 to handle the next primitive. If the primitive is not culled, VPC block 304 may perform further processing at step 916. Examples of such further processing include clipping (described above); any such processing may be implemented using conventional techniques. After VPC block 304 has completed its processing, the primitive is delivered to setup block 306 (step 918), and process 900 returns to step 902 to handle the next primitive.

It will be appreciated that the VPC process described herein is illustrative and that variations and modifications are possible. Steps described as sequential may be executed in parallel, order of steps may be varied, and steps may be modified or combined. The VPC block (or any other block of the rendering pipeline) may be implemented in a pipelined fashion so that different processing steps can be executed concurrently for different primitives. In some embodiments, the option of enabling or disabling diamond culling may be available per primitive, per object, or per frame; in other embodiments the option to disable diamond culling may be omitted. Depending on implementation, enabling or disabling of diamond culling may be controlled in the VPC block, e.g., by determining whether any conditions that call for disabling exist, or via an API, e.g., by supplying a "diamond cull enable" flag per primitive, per object or per frame, as desired.

While the invention has been described with respect to specific embodiments, one skilled in the art will recognize that numerous modifications are possible. For instance, diamond culling may be performed for lines or triangles or both. The triangle culling described herein can also be extended to simple polygons with any number of vertices.

The diamond coordinate system may be varied as desired, so long as each (internal and external) diamond is uniquely identifiable and so long as neighbors of a diamond can be identified in a way that supports the applicable culling rules. Culling rules may be based on any pixel coverage rule and may result in culling some or all of the small geometry that does not cover or hit any pixels; such rules need not conform to the diamond exit rule or to other rules of OpenGL or any particular standard or convention. For example, a "diamond entry rule" could also be implemented, or a non-directional boundary crossing rule in which the line is drawn if it either enters or exits an internal diamond.

Further, the invention is not limited to the diamond boundaries described herein. Various other boundaries(e.g., circles, octagons, or other polygons) might be defined around a pixel center, and boundary crossings may be used to define a coverage rule for lines. In general, the boundaries divide the raster into internal regions and external regions, with each region being assigned unique "canonical" coordinates. Culling logic can be applied by snapping each vertex of a primitive to the canonical coordinates for the region in which that vertex is located, then applying one or more culling rules based on the canonical coordinates of the vertices.

Moreover, the rendering pipeline shown herein has been divided into various functional blocks for convenience of description. Those skilled in the art will recognize that the functional blocks need not correspond to the organization or physical layout of a hardware implementation. In particular, small-primitive culling logic may be placed elsewhere in the pipeline, e.g., at the beginning of a setup stage, rather than in the VPC stage.

Graphics processors implementing a rendering pipeline according to an embodiment of the present invention may be adapted for use in a variety of systems, including general purpose computing systems, special purpose systems such as video game consoles, medical imaging systems, and the like.

Thus, although the invention has been described with respect to specific embodiments, it will be appreciated that the invention is intended to cover all modifications and equivalents within the scope of the following claims.

What is claimed is:

1. In a graphics processing system, a method for culling small primitives from geometry data to be rasterized onto an array of pixels, the method comprising:

dividing the pixel array into a plurality of internal regions and a plurality of external regions, wherein each internal region corresponds to an area of the pixel array that includes a center point of one of the pixels and each external region corresponds to an area of the pixel array between internal regions, wherein the internal regions include a plurality of substantially diamond shaped regions, each diamond-shaped internal region being centered on a pixel center, wherein the external regions include a plurality of substantially diamond shaped regions, each diamond-shaped external region being centered on an intersection point of edges of a pixel;

defining a unique canonical location identifier for each of the internal and external regions, wherein the canonical location identifier for each region includes a type indicator having a first state for indicating that the region is an internal region and a second state for indicating that the region is an external region;

receiving a primitive having a plurality of vertices;

assigning one of the canonical location identifiers to each vertex of the primitive, wherein the assigned identifier identifies the region of the pixel array that contains the vertex;

determining, based on the respective canonical location identifiers of each vertex, whether the primitive satisfies a visibility rule defined with reference to a boundary crossing between an internal region and an external region;

culling the primitive in the event that the primitive does not satisfy the visibility rule, and rasterizing the primitive onto the pixel array, if the primitive has not been culled.

2. The method of claim 1, further comprising generating edge equations for primitives that were not culled, wherein the act of generating edge equations is performed subsequently to the act of culling.

3. The method of claim 1, wherein a first one of the diamond-shaped internal regions includes a corner point at a pixel edge, wherein the corner point is also included in a second one of the diamond-shaped internal regions.

4. The method of claim 1, wherein the type indicator has a third state for indicating that the point is a corner point at a pixel edge, the corner point being included in a first one and a second one of the diamond-shaped internal regions.

5. The method of claim 1, wherein the canonical location identifier for each diamond-shaped external region further includes screen coordinates of the intersection point on which the diamond-shaped external region is centered.

6. The method of claim 5, wherein the canonical location identifier for each diamond-shaped internal region includes screen coordinates of a corner of the pixel on whose center point the diamond-shaped internal region is centered.

7. The method of claim 1, wherein the primitive is a line having a start vertex and an end vertex, and wherein the visibility rule is satisfied in the event that the line exits one of the internal regions.

8. The method of claim 7, wherein the line is culled in the event that either (i) the start vertex and the end vertex are both in the same region or (ii) the start vertex is in an external region and the end vertex is in an adjacent internal region.

9. The method of claim 1, wherein the primitive is a polygon having a plurality of vertices, and wherein the visibility rule is satisfied in the event that any of the vertices is in an internal region.

10. The method of claim 9, wherein the primitive is culled in the event that all of the vertices are in the same external region.

11. The method of claim 1, wherein culling the primitive includes removing the primitive from the geometry data.

12. The method of claim 1, wherein culling the primitive includes setting a cull flag to indicate that the primitive is to be ignored.

13. The method of claim 1, further comprising rasterizing the geometry data, excluding any primitive that is culled during the act of culling, thereby generating pixel data for an image.

14. A device for rendering geometry data for an image onto a pixel array, the device comprising:

a canonical coordinate module coupled to receive vertices of primitives of the geometry data and configured to compute a canonical location identifier for each vertex, wherein the canonical location identifier uniquely identifies one of a plurality of regions within the pixel array, and wherein the canonical location identifier includes:

a type identifier that indicates whether the region is an internal region or an external region; and diamond coordinates associated with the region, the plurality of regions including a plurality of internal regions that each include a center point of one of the pixels and a plurality of external regions that each correspond to an area of the pixel array between internal regions, wherein the internal regions include a plurality of substantially diamond shaped regions, each diamond-shaped internal region being centered on a pixel center, and wherein the external regions include a plurality of substantially diamond shaped regions, each diamond-shaped external region being centered on an intersection point of edges of a pixel;

culling logic coupled to the canonical coordinate module and configured to apply a visibility rule to each of the primitives using the canonical location identifiers of the vertices of the primitive, wherein the visibility rule is defined with reference to a boundary crossing between an internal region and an external region, the culling logic being further configured to cull the primitive in the event that the visibility rule is not satisfied; and a raster conversion module coupled to receive primitives that are not culled and configured to generate pixel data from the received primitives.

15. The device of claim 14, further comprising a geometry transformation module coupled to receive geometry data from a data source, the transformation module being configured to transform vertices included in the geometry data to screen coordinates and to provide the transformed geometry data to the canonical coordinate module, wherein the canonical coordinate module is further configured to operate using the screen coordinates.

16. The device of claim 14, wherein the raster conversion module includes:

a setup unit configured to generate one or more edge equations for each primitive that is not culled; and a rasterizer configured to determine coverage of a pixel by a primitive based at least in part on the one or more edge equations received from the setup unit.

17. The device of claim 14, wherein the diamond coordinates associated with a diamond-shaped external region are screen coordinates of the intersection point on which the diamond-shaped external region is centered, and wherein the diamond coordinates associated with a diamond-shaped internal region are screen coordinates of a corner of the pixel on whose center point the diamond-shaped internal region is centered.

18. The device of claim 14, wherein the culling module is further configured to cull a line primitive having a start vertex and an end vertex in the event that either (i) the start vertex and the end vertex are both in the same region or (ii) the start vertex is in an external region and the end vertex is in an adjacent internal region.

19. The device of claim 14, wherein the culling module is further configured to cull a polygon primitive in the event that all of the vertices of the polygon primitive are in the same external region.

* * * * *